United States Patent
Queinnec

[11] Patent Number: 6,110,036
[45] Date of Patent: Aug. 29, 2000

[54] MULTI-VALVE AIR INLET DEVICE FOR A MOTOR VEHICLE

[75] Inventor: Jean-Yves Queinnec, Elancourt, France

[73] Assignee: Valeo Climatisation, La Verriere, France

[21] Appl. No.: 09/407,596

[22] Filed: Sep. 28, 1999

[30] Foreign Application Priority Data

Sep. 29, 1998 [FR] France .................................. 98 12142

[51] Int. Cl.$^7$ .................................................. B60H 1/26
[52] U.S. Cl. ........................................................... 454/139
[58] Field of Search ........................... 454/139, 99, 228; 137/606

[56] References Cited

U.S. PATENT DOCUMENTS 4,614,152  9/1986  Fukasaku et al. .
5,645,479  7/1997  Komowski .
5,876,277  3/1999  Uemura et al. .......................... 454/139

FOREIGN PATENT DOCUMENTS 0 423 778   4/1991   European Pat. Off. .
0 678 419  10/1995   European Pat. Off. .

Primary Examiner—Denise L. Ferensic
Assistant Examiner—Jiping Lu
Attorney, Agent, or Firm—Morgan & Finnegan, LLP

[57] ABSTRACT

An air inlet control device for a ventilating, heating and/or air conditioning system in a motor vehicle comprises a main valve pivotable about a first axis of rotation for selectively closing off a recirculated air inlet and a fresh air inlet, and a pressure adjusting valve, which is also movable pivotally so as to act on the dynamic pressure of the air at the fresh air inlet when the main valve is covering the recirculated air inlet. The pressure adjusting valve has an axis of rotation which is carried by the main valve and which is spaced away from the axis of rotation of the main valve.

12 Claims, 4 Drawing Sheets

MULTI-VALVE AIR INLET DEVICE FOR A MOTOR VEHICLE

FIELD OF THE INVENTION

The present invention relates to a multi-valve device for an air inlet for installation in a motor vehicle.

BACKGROUND OF THE INVENTION

It is known from the specification of European patent application No. 0 678 410 to provide an air inlet for a motor vehicle which includes a main valve of the drum type, which selectively obturates a fresh air inlet or a recirculated air inlet, together with a pressure adjusting valve, the purpose of which is to generate dynamic pressure in the fresh air. The pressure adjusting valve is coaxial with the main valve, and is again of the drum type. Pivoting movement of the two valves is controlled by a single drive device which cooperates with control levers so as to provide cam operated control of the displacement of the valves. In another version, the two valves may be controlled separately.

Controlled displacement of the pressure adjusting valve enables the dynamic pressure at the fresh air inlet to be held substantially constant regardless of the flow velocity of the air at the fresh air inlet, since this velocity is a function of the speed of forward travel of the vehicle and of the ambient wind speed.

The coaxial arrangement of the two drum type valves has the result that the multi-valve device occupies a great deal of space, and this is a disadvantage due to the fact that the rules and practices of vehicle design tend always to greater and greater economy of space.

Another disadvantage of the device described in the above mentioned patent is that, when the main valve is operated so as to obscure the recirculated air inlet, the valve which generates dynamic pressure partly covers the fresh air inlet. Similarly, when the main valve is operated so as to cover the fresh air inlet, the dynamic pressure generating valve, i.e. the pressure adjusting valve, will in general momentarily occupy a position in which it partly covers the recirculated air inlet. As a result, it is necessary in each case to withdraw the pressure generating valve entirely into the interior of the main valve in order to open an air inlet fully.

In the case where the two valves are controlled by a single mechanism, the driving device has to be able to provide sufficiently precise positioning of the pressure adjusting valve. Such a device, for example a motorised reduction unit with a stepping motor, does not enable the valves to be operated with a high pivoting speed.

In the other case, in which the two valves are controlled separately, the pressure adjusting valve can only be controlled by a relatively light mechanism, for example a step-by-step motorised reduction unit, which means that the above mentioned withdrawal of the pressure adjusting valve into the interior of the main valve cannot be carried out at high speed.

In either of these two cases, the time for full opening of one or other of the air inlets is unable to be optimised.

DISCUSSION OF THE INVENTION

One object of the invention is to provide a multi-valve device which occupies less space than the device described in the above mentioned patent application EP 0 678 410.

Another object of the invention is to provide such a device in which the displacement of the main valve produces displacement of the pressure adjusting valve.

A further object of the invention is to provide such a device which has a shorter reaction time than is possible in the prior art.

Yet another object of the invention is to enable rapid closure of the recirculated air inlet or the fresh air inlet to be obtained by acting only on the main valve, this being accompanied by full opening of the fresh air inlet or the recirculated air inlet as appropriate.

According to the invention, a multi-valve device for an air inlet of a motor vehicle, of the type comprising a main valve pivoting about an axis of rotation in such a way as to obturate, selectively, a recirculated air inlet and a fresh air inlet, and a pressure adjusting valve which is arranged for pivoting movement in such a way as to act on the dynamic pressure of the air at the fresh air inlet when the main valve is obturating the recirculated air inlet, is characterised in that the pressure adjusting valve has an axis of rotation which is carried by the main valve and which is spaced away from the axis of rotation of the main valve.

The main valve is preferably of the curtain type.

The pressure adjusting valve is preferably of the drum type.

According to a preferred feature of the invention, the multi-valve device includes a means for driving the main valve which is carried by the main valve or by a wall of the air inlet.

According to a further feature of the invention, the multi-valve device includes a means for driving the pressure adjusting valve, this driving means being carried either by the main valve or by the pressure adjusting valve.

Separate control of the two valves enables the positioning of the pressure adjusting valve, which generates dynamic pressure, to be carried out more accurately, and at the same time it enables the fresh air inlet to be closed more quickly.

The multi-valve device may be characterised in that, when the main valve is closing off the main air inlet, the pressure adjusting valve is upstream of the main valve with reference to the direction of flow of the fresh air when the latter is feeding the fresh air inlet. With this feature, regardless of the position of the pressure adjusting valve, the latter is unable to obturate, even partly, the recirculated air inlet when the main valve is covering the fresh air inlet.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
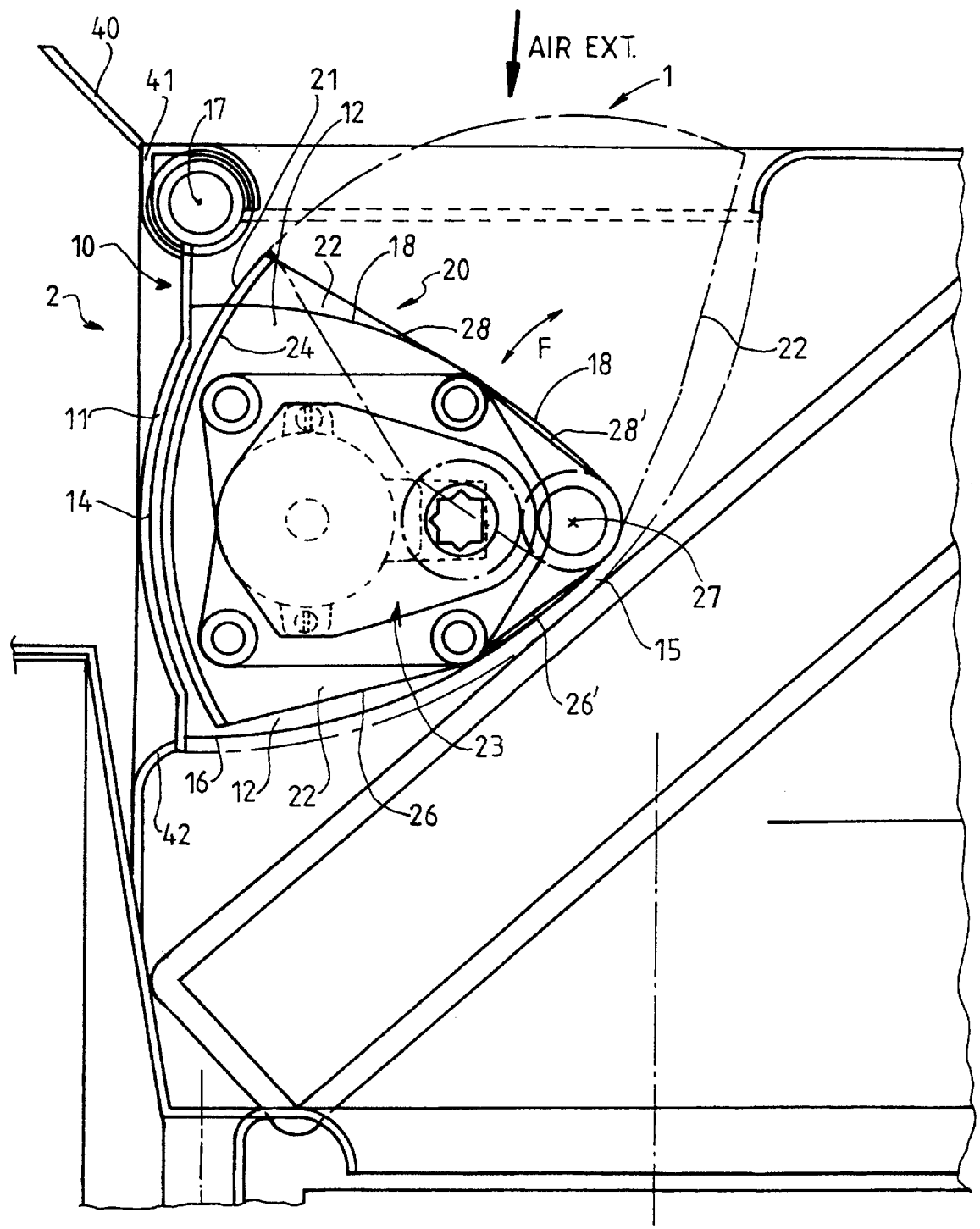
FIG. 1 shows a preferred practical embodiment of the device in accordance with the invention, shown in a first position, or setting, in which the main valve obscures the recirculated air inlet, and in which the pressure adjusting valve is in its retracted position.

The drawing shows a multi-valve air inlet device for a motor vehicle, and as is shown in FIG. 1 for example, this device includes a main valve 10. In this example the valve 10 is of the curtain type and is rotatable about an axis of rotation which is the axis of a spindle 17. This spindle is mounted in a wall 41 of an air inlet casing, close to a bulkhead or separating wall 40 which separates a fresh air inlet 1 from a recirculated air inlet 2.

The main valve 10 has an obturating surface 11, one edge of which is extended by a portion 12, also referred to as a wing, which in this example is flat and lies in a plane at right angles to the axis of the spindle 17. The wing 12 has a contour in the form of a curvilinear triangle, the three sides of which consist of edges 14, 16 and 18 respectively. The edge 14 corresponds to the concavity of the obturating surface 11 of the valve, which extends towards the wing 12, that is to say towards the downstream side of the recirculated air inlet 2, when the valve is in the position shown in FIG. 1.

The valve 10 is displaced in rotation by any suitable conventional means, which may consist of a simple mechanical linkage, or which may include an actuator such as a pneumatic jack, or again a motorised reduction gear unit of the fast direct current type having two positions, or again a motorised reduction unit having a stepping motor.

The wing 12 carries, close to the apex 15 of the curved triangle 14, 16, 18, a spindle 27 defining the axis of rotation of a second valve of the apparatus, namely a pressure adjusting valve 20 which, in this example, is of the drum type. This drum valve 20 has a curvilinear obturating surface 21, which in the folded back position shown in FIG. 1 extends along the curved obturating surface 11 of the main valve 10. The surface 21 also includes a flat wing 22 joined to the surface 21. The wing 22 is parallel to the wing 12 of the main valve 10, and has a contour that again has the general appearance of a curvilinear triangle except that it has an arcuate side 24 and two pairs of straight sides 26, 26' and 28, 28' respectively.

In the example shown in the drawings, the wing 22 of the pressure adjusting valve carries a drive mechanism 23 which effects relative displacement between the two valves 10 and 20. In this case the drive mechanism 23 comprises a motorised reduction gear, which is for example of the step-by-step or direct current type, whereby the pressure adjusting valve 20 is rotated about the spindle 27 parallel to the axis 17, so as to fulfill its function of generating dynamic pressure of the fresh air in the region of the fresh air inlet 1. Alternatively, the drive mechanism 23 may be mounted on the main valve 10.

Figure 2:
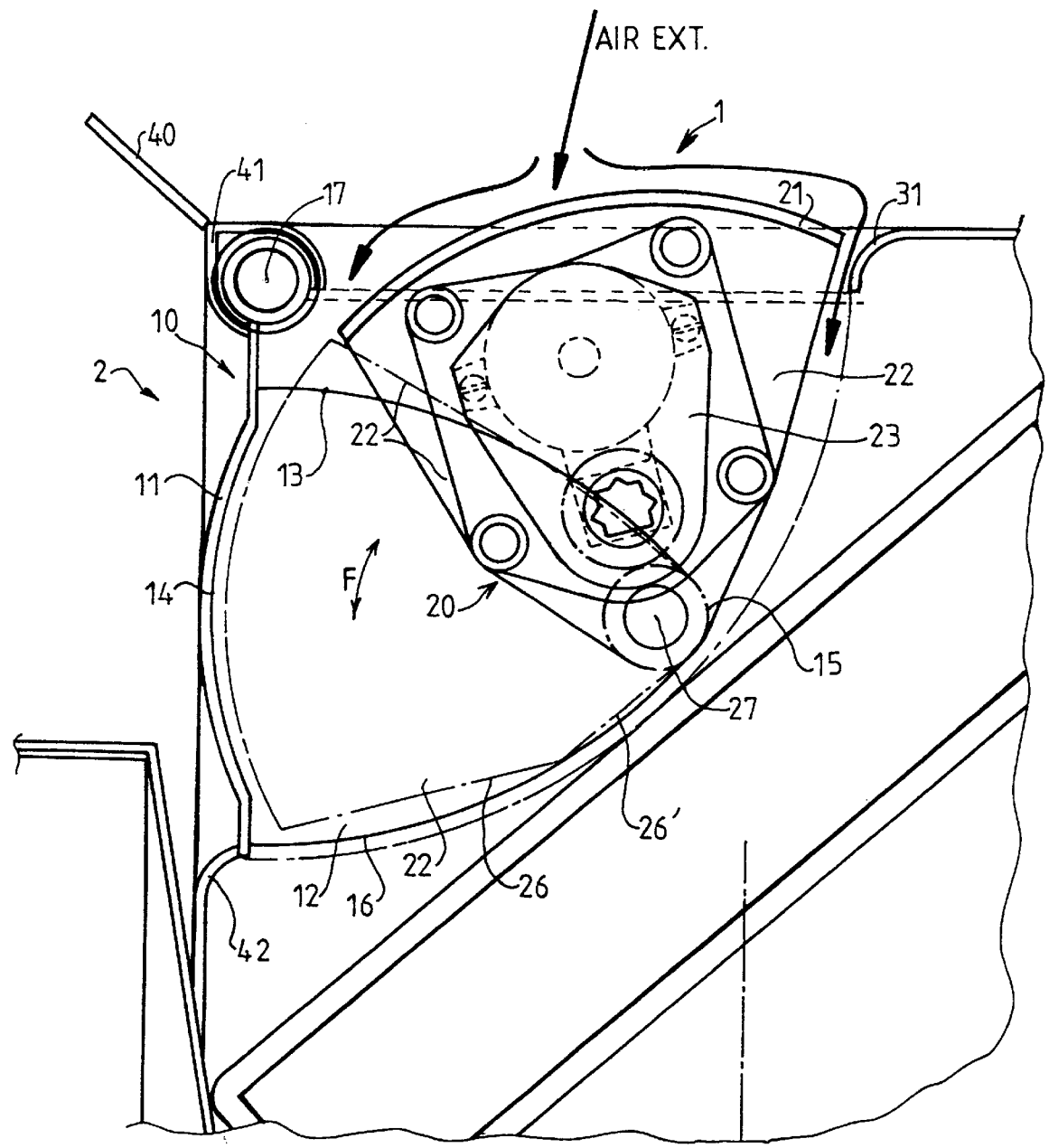
FIG. 2 shows the same device as in FIG. 1, in a second setting which is different from the first setting shown in FIG. 1 in that the pressure adjusting valve is in its deployed position.

In position I shown in FIG. 1, the main valve 10 is in abutment on the edge 42 of the recirculated air inlet 2. The main valve 10 preferably has conventional sealing means in this connection, which are not shown. The angular displacement of the pressure adjusting valve 20, which is produced by the drive mechanism 23, enables the obturating working surface 21 to mask the fresh air inlet 1 to a greater or lesser extent in order to generate the required dynamic pressure, which is due in particular to the speed of travel of the vehicle. Whereas FIG. 1 shows the multi-valve device in the position denoted I, FIG. 2 shows it in another position which will be called position II, in which the pressure adjusting valve 20 is in its maximum deployment position, in which it gives maximum obturation of the fresh air inlet 1. The recirculated air inlet 2 is still covered by the main valve 10.

It can be seen from FIG. 2 in particular that the fresh air passes along the curved profile 21, and passes firstly between one edge of the latter and an edge 31 of the air inlet housing, and secondly between the opposite edge of the profile 21 and the spindle 17.

Figure 3:
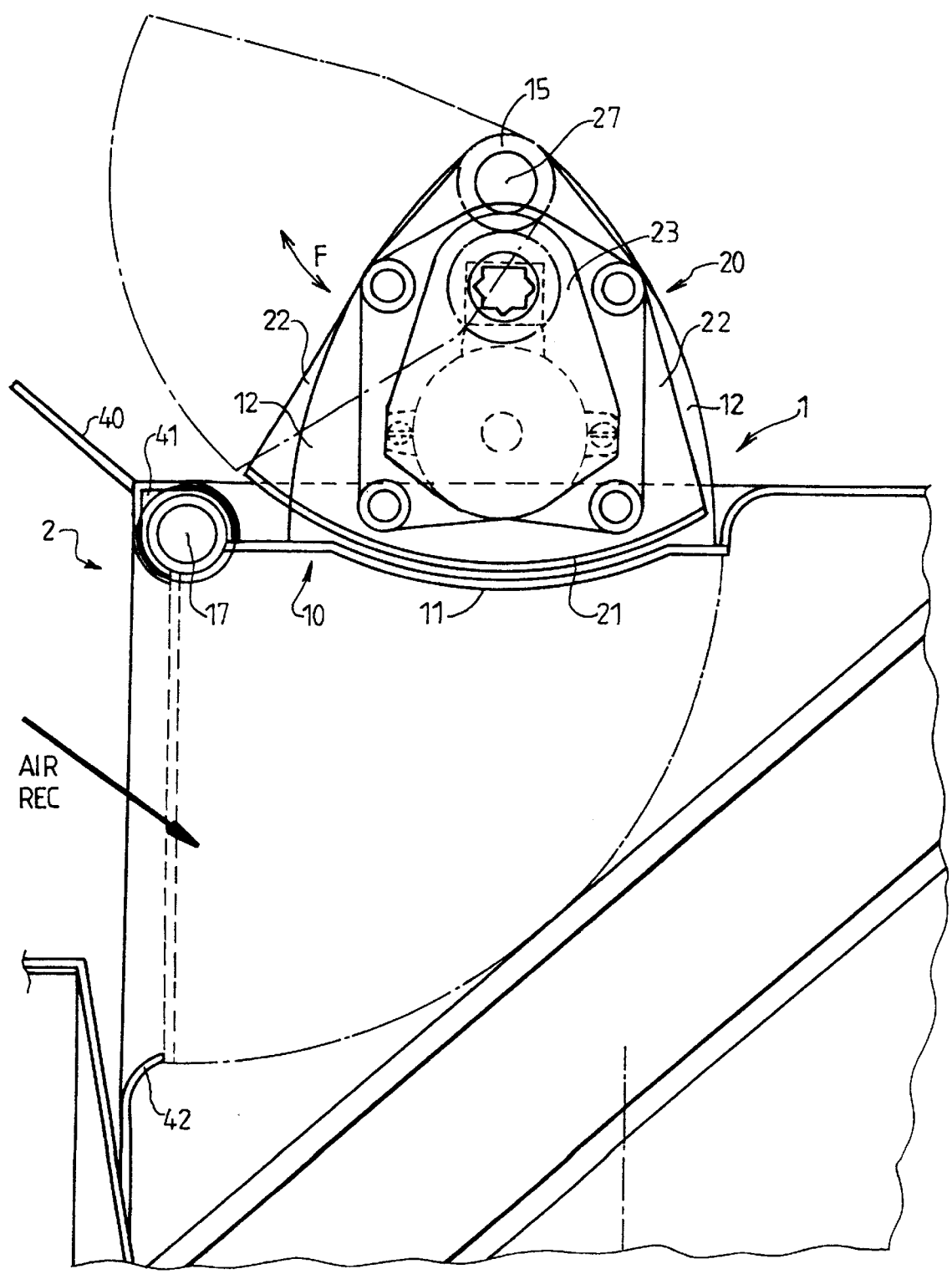
FIG. 3 shows the same device as FIGS. 1 and 2, but in a third setting in which the main valve obturates the fresh air inlet, with the pressure adjusting valve being in its retracted position.

FIG. 3 shows a third position which will be referred to as position III. In this position the main valve 10 covers the air inlet 1, with the other valve 12 being in its folded back position.

Figure 4:
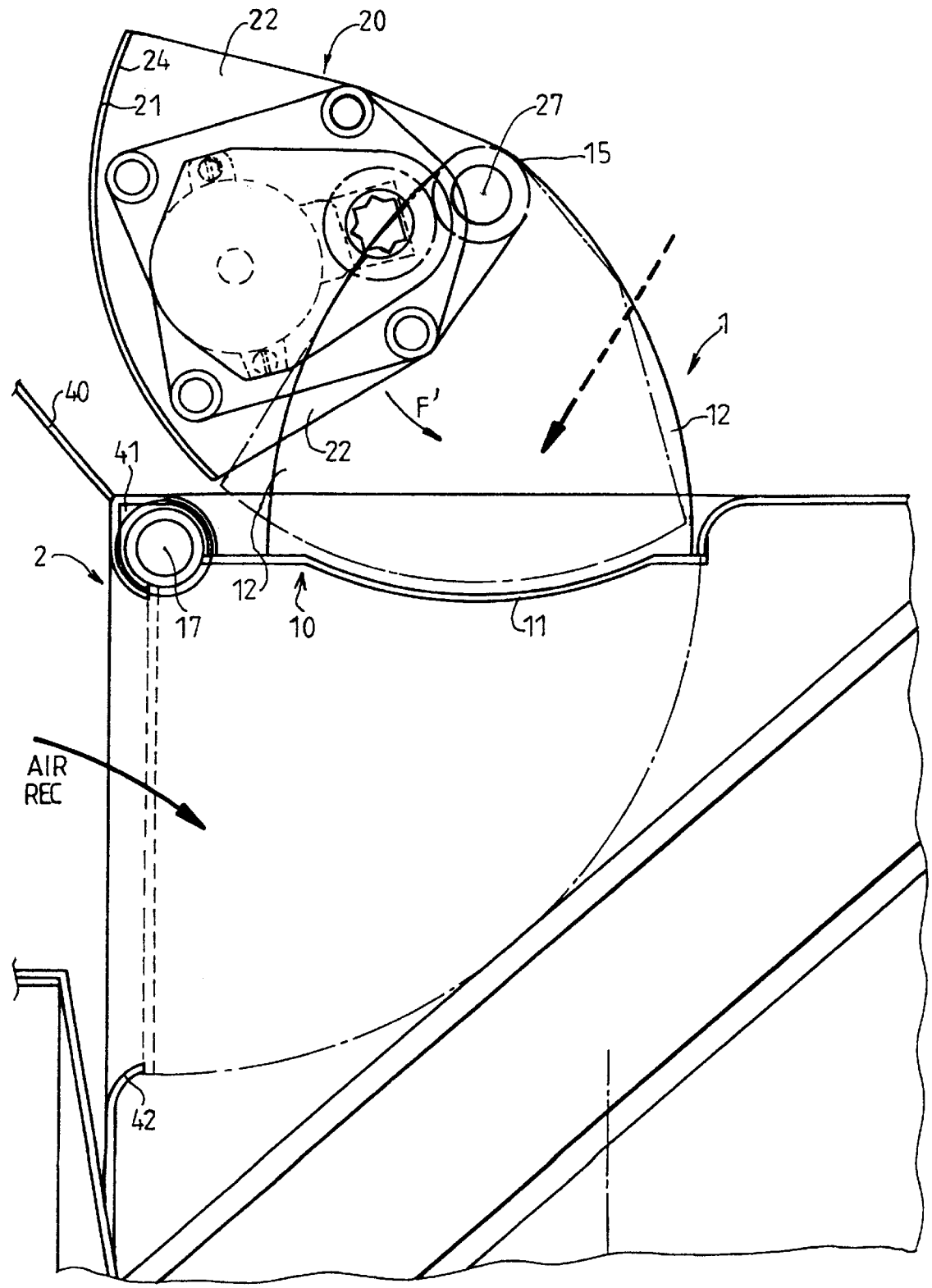
FIG. 4 again shows the same device as the other Figures, but in a fourth setting or position, in which the main valve obturates the fresh air inlet, with the pressure adjusting valve being in its deployed position.

With reference to FIG. 4, this shows the device in a position which will be called position IV, in which the main valve 10 covers the fresh air inlet 1 while the other valve 12 is in the same deployed position as in FIG. 2.

It will be seen that, because of the use in this device of two axes of rotation quite separate from each other, namely those of the spindles 17 and 27, the drum valve 20 is situated upstream of the main valve 10 with reference to the direction of flow of the fresh air when it is supplying the air inlet 1. Under these conditions, and regardless of the position of the pressure regulating valve 20, the recirculated air inlet 2 is fully open when the main valve 10 is covering the fresh air inlet 1.

The preferred use of two actuators enables the device to have two advantageous features, namely high precision in the positioning of the pressure adjusting valve 20, due for example to the use of a step-by-step motorised reduction unit, and rapid total closing of the fresh air inlet 1 when this is required. In this connection, the main valve 10 can be driven by an actuator such as a jack, a motorised reduction unit of the direct current type, or a simple mechanical linkage which is quicker in action than a reduction gear unit having a stepping motor, which would control both of the valves 10 and 20 through a complex common drive train, as is described in the above mentioned European patent No. 0 678 410.

Even if the modified version, or variant, envisaged in that patent is considered, in which both valves could be controlled independently, the arrangement in accordance with the present invention remains advantageous in terms of speed of action. This is because, in the mechanism of the prior art, in the event of rapid closure of one of the air inlets, it is necessary that the valve that generates dynamic pressure should revert to its retracted position so that it can entirely free the other air inlet. In the device according to the invention here described, the pressure adjusting valve 20 is able to revert to its retracted position because it is masked between position IV and position III.

Some points will now be mentioned regarding the operation of the multi-valve device. Position I ensures maximum opening of the fresh air inlet section 1, whereas position II gives minimum opening, the valve 20 being in its maximum obturating position. All of the intermediate positions between position I and position II are possible, which enables the fresh air inlet section 1 to be modulated and enables the required function of dynamic pressure generation to be achieved.

Position III corresponds to the "recycling" position. The valve 2 is normally in its retracted position with respect to the main valve 10.

Position IV corresponds to the "recycling" position after actuation of the main valve 10 when the valve 20 was in a deployed position. The actuator of the valve 20 returns the latter progressively to position III in the direction of the arrow F'. This occurs while the valve is masked, that is to say before the main valve 10 is again actuated.

Because the valve 20 is driven by a positioning device such as a step-by-step motorised reduction unit, its motion is more gentle than that of the main valve 10.

It is even possible to preposition the valve 20 in such a way that, when the main valve 10 is once again actuated in order to cover the air inlet 2, the fresh air inlet 1 is obturated in a desired manner as a function of the speed of the vehicle. In particular, during the movement of the main valve 10 between the position in which it cuts off the circulated air and the position in which it cuts off admission of fresh air through the inlet 1, or during the opposite movement, the pressure adjusting valve 20 may be controlled in such a way as to perform a movement, simultaneously or otherwise, between any two given positions with respect to the main valve 10.

Operating sequences typically employed in practice are as follows:

low speed mode (no dynamic pressure generated): position I and position III in succession;

high speed mode (with maximum generation of dynamic pressure): position I, position II, position IV, position III in succession.

The valves 10 and 20 may of course be of another type than that which has been mentioned in the foregoing by way of example.

The invention is also concerned with an installation for heating and ventilation, and/or air conditioning, which includes a multi-valve air inlet device of the kind described above.

What is claimed is:

1. A multi-valve air inlet device for a motor vehicle, comprising: a fresh air inlet; a recirculated air inlet; a main valve; a pressure adjusting valve; a first pivot mounting the main valve for pivoting movement between a first position obturating the recirculated air inlet and a second position obturating the fresh air inlet; and means mounting the pressure adjusting valve for pivoting movement with respect to the fresh air inlet whereby the pressure adjusting valve can act on the dynamic pressure of the air at the fresh air inlet when the main valve is obturating the recirculated air inlet, wherein the means mounting the pressure adjusting valve is a second pivot carried by the main valve and spaced away from the first pivot.

2. A device according to claim 1, wherein the main valve is a curtain type valve.

3. A device according to claim 1, wherein the pressure adjusting valve is a drum type valve.

4. A device according to claim 1, further including a drive means connected to the main valve for actuating the main valve, and wherein the air inlets include a wall, the drive means being carried by an element selected from the group consisting of the main valve and the wall.

5. A device according to claim 4, wherein the drive means for the main valve is selected from the group consisting of actuators, direct current motorised reduction units, reduction units comprising a stepping motor, and mechanical linkages.

6. A device according to claim 1, further including a drive means for the pressure adjusting valve, connected to the pressure adjusting valve and carried by one of the valves.

7. A device according to claim 6, wherein the drive means for the pressure adjusting valve is a positioning device.

8. A device according to claim 1, including means coupled to the pressure adjusting valve for displacing the pressure adjusting valve between a retracted position and a deployed position, corresponding respectively to maximum opening and maximum covering of the fresh air inlet when the main valve is obturating the recirculated air inlet.

9. A device according to claim 8, wherein the main valve has a first obturating surface and the pressure adjusting valve has a second obturating surface, the means mounting the pressure adjusting valve being such as to put the second obturating surface in overlying relationship with the first obturating surface in the retracted position.

10. A device according to claim 1, wherein the means mounting the pressure adjusting valve are positioned such that the pressure adjusting valve is upstream of the main valve with respect to the direction of flow of fresh air feeding the fresh air inlet, when the main valve is obturating the fresh air inlet.

11. A device according to claim 1, including means connected with said valves for permitting, during movement of the main valve between its respective positions obturating the air inlets, displacement of the pressure adjusting valve between two given positions with respect to the main valve.

12. A ventilating installation including a device according to claim 1.

* * * * *